(12) United States Patent
Manja Ppallan et al.

(10) Patent No.: US 12,245,070 B2
(45) Date of Patent: Mar. 4, 2025

(54) METHOD AND SYSTEM FOR MANAGING QUALITY-OF-SERVICE (QOS) IN COMMUNICATION NETWORKS

(71) Applicant: Samsung Electronics Co., Ltd., Gyeonggi-do (KR)

(72) Inventors: Jamsheed Manja Ppallan, Bangalore (IN); Karthikeyan Arunachalam, Bangalore (IN); Shiva Souhith Gantha, Bangalore (IN); Sweta Jaiswal, Bangalore (IN); Anshuman Nigam, Bangalore (IN); Seongkyu Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 418 days.

(21) Appl. No.: 17/749,552

(22) Filed: May 20, 2022

(65) Prior Publication Data
US 2022/0369153 A1    Nov. 17, 2022

Related U.S. Application Data

(63) Continuation of application No. PCT/KR2021/006143, filed on May 17, 2021.

(30) Foreign Application Priority Data

May 17, 2020   (IN) .............................. 202041020781
May 13, 2021   (IN) .............................. 202041020781

(51) Int. Cl.
  *H04W 28/02*   (2009.01)
  *H04W 28/10*   (2009.01)
  *H04W 28/24*   (2009.01)

(52) U.S. Cl.
  CPC ... *H04W 28/0268* (2013.01); *H04W 28/0289* (2013.01); *H04W 28/10* (2013.01); *H04W 28/24* (2013.01)

(58) Field of Classification Search
  CPC ......... H04W 28/0268; H04W 28/0289; H04W 28/10; H04W 28/24
  See application file for complete search history.

(56) References Cited

U.S. PATENT DOCUMENTS

| | | | |
|---|---|---|---|
| 6,891,798 B1 * | 5/2005 | Yip .......................... | H04L 47/30 370/252 |
| 2004/0013089 A1 * | 1/2004 | Taneja .................. | H04L 47/824 370/335 |

(Continued)

FOREIGN PATENT DOCUMENTS

KR   10-2020-0054574   5/2020

OTHER PUBLICATIONS

International Search Report dated Aug. 31, 2021 issued in counterpart application No. PCT/KR2021/006143, 3 pages.

(Continued)

*Primary Examiner* — Kevin C. Harper
(74) *Attorney, Agent, or Firm* — The Farrell Law Firm, P.C.

(57) ABSTRACT

A method and an apparatus are provided for managing quality of service (QoS) in a communication network. A plurality of data flows related to at least one application associated with a user equipment (UE) is received. At least one data flow that requires QoS management related to the at least one application is identified from the plurality of data flows based on an analysis of at least one of a plurality of attributes related to the at least one application. The at least one data flow is classified into a QoS class associated with the at least one application. The at least one data flow is prioritized based on the QoS class.

19 Claims, 13 Drawing Sheets

(56) References Cited

U.S. PATENT DOCUMENTS

| | | |
|---|---|---|
| 2009/0010202 A1 | 1/2009 | Masayuki et al. |
| 2010/0232366 A1 | 9/2010 | Iwamura et al. |
| 2012/0140633 A1 | 6/2012 | Stanwood et al. |
| 2013/0173793 A1* | 7/2013 | Voien .................. H04L 67/535 709/224 |
| 2013/0322451 A1 | 12/2013 | Wang et al. |
| 2017/0093740 A1 | 3/2017 | Park et al. |
| 2017/0279725 A1 | 9/2017 | Lee et al. |

OTHER PUBLICATIONS

Written Opinion dated Aug. 31, 2021 issued in counterpart application No. PCT/KR2021/006143, 5 pages.

ETSI TS 123 501 V16.6.0 (Oct. 2020), 5G; System architecture for the 5G System (5GS) (3GPP TS 23.501 version 16.6.0 Release 16), pp. 450.

An, Namwon et al., "Slice Management for Quality of Service Differentiation in Wireless Network Slicing", Sensors 2019, 19, 2745, pp. 19.

Khairi, Sara et al., "Towards a Dynamic QoS Management in IMS Transport Layer via SDN".

2016 IEEE/ACS 13th International Conference of Computer Systems and Applications (AICCSA), 2016, pp. 8.

Zhani, Mohamed Faten et al., "FlexNGIA: A Flexible Internet Architecture for the Next-Generation Tactile Internet", arXiv:1905.07137, Pub Date: Jul. 22, 2020, pp. 39.

Cui, Yong et al., "Deadline-aware Transport Protocol", https://tools.ietf.org/id/draft-shi-quic-dtp-01.html, Jan. 16, 2020, pp. 10.

\* cited by examiner

METHOD AND SYSTEM FOR MANAGING QUALITY-OF-SERVICE (QOS) IN COMMUNICATION NETWORKS

CROSS-REFERENCE TO RELATED APPLICATIONS

This application is a bypass continuation of International Application No. PCT/KR2021/006143 designating the United States, filed on May 17, 2021 in the Korean Intellectual Property Receiving Office, and claims priority to Indian Application Nos. 202041020781 PS and 202041020781 CS, respectively filed on May 17, 2020 and May 13, 2021 at India Intellectual Property, the disclosures of all of which are incorporated herein by reference in their entireties.

BACKGROUND

1. Field

The disclosure is related generally to communication network and network traffic control and management systems, and more particularly, to a method and system for managing quality of service (QoS) in a communication network.

2. Description of Related Art

With the emergence of futuristic applications and computer technologies, achieving end-to-end QoS has gained importance. 5th generation (5G) systems have introduced network slicing on a virtualized network environment, and application specific QoS management has come to support a variety of verticals, such as, for example, an enhanced mobile broadband (eMBB), ultra-reliable low latency communication (URLLC), and massive Internet of things (mIoT). It is expected that next-generation systems will support more diverse applications demanding its own quality characteristics for network services. Currently known communication protocols, which are based on layering design and best-effort paradigm, do not provide necessary precision and adaptability required for various means of QoS support.

With increasing mobile access to the Internet, many futuristic applications have emerged in the last few years, ranging from virtual reality (VR) to extended reality (XR), holoportation, teleportation, digital twins, etc. An existing transport/network layer handles every application evenly regardless of their expectations, which can be delay-tolerant or delay-sensitive services. Thus, there is an inability of the existing transport layer to comprehend application behavior and prioritize traffic flows that affect QoS.

In addition, these existing transport/network layers do not provide guaranteed "on-time" delivery for data packets. These layers cannot identify priorities of the data flows, such as, URLLC, sensor control messages, (SCMs), etc. In addition, the transport layer fails to deliver benefits of lower-layer flow prioritization methods, such as, for example, 5G QoS identifier (5QI) and packet filtering, to the applications. Moreover, existing transport layer protocols are designed based on "best effect" delivery. It cannot classify data flows based on its priority. The current transport/network layer handles every application evenly regardless of their expectations, which can be high-data-rate, delay-sensitive, and constant bit rate (CBR).

Congestion and flow control mechanisms used by transmission control protocol (TCP) and quick user datagram protocol (UDP) internet connections (QUIC) protocols restrict user equipment (UE) ability to utilize underlying network capacity to the fullest. Though TCP variants have been designed to improve throughput in case of congestion and packet loss, these variants are not suitable for every network condition. The transport layer protocol manages every application flow uniformly and employs a similar congestion/flow mechanism for all network conditions, irrespective of traffic.

Thus, the existing transport layer is not flexible and has not given most of its controls to application and network layers. Also, these layers cannot control the transport layer parameters per connection flow.

SUMMARY

According to an aspect, a method is provided for managing QoS in a communication network. A plurality of data flows related to at least one application associated with a UE is received. At least one data flow that requires QoS management related to the at least one application is identified from the plurality of data flows based on an analysis of at least one of a plurality of attributes related to the at least one application. The at least one data flow is classified into a QoS class associated with the at least one application. The at least one data flow is prioritized based on the QoS class.

According to an aspect, a network entity is provided for managing QoS in a communication network. The network entity includes at least one processor and a memory communicatively coupled to the at least one processor. The memory stores processor-executable instructions, which, upon execution, may cause at least one processor to receive a plurality of data flows related to at least one application associated with a UE. The at least one processor is also caused to identify at least one data flow, from the plurality of data flows, that requires QoS management related to the at least one application based on an analysis of at least one of a plurality of attributes related to the at least one application. The at least one processor is also caused to classify the at least one data flow into a QoS class associated with the at least one application, prioritize the at least one data flow based on the QoS class.

According to an aspect, a method is provided for managing QoS for a UE in a communication system. QoS requirements of each application running in the UE are determined. A context oriented transport (COT) layer is configured between the UE and a network entity for varying a data flow for each application with reference to QoS requirements for the respective application.

According to an aspect, a multi-layer system for wireless communication is provided. The multi-layer system includes a transport layer, an application layer, and at least one COT layer between the transport layer and the application layer to vary a data flow for a plurality of applications with reference to predefined QoS requirements for each of the plurality of applications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
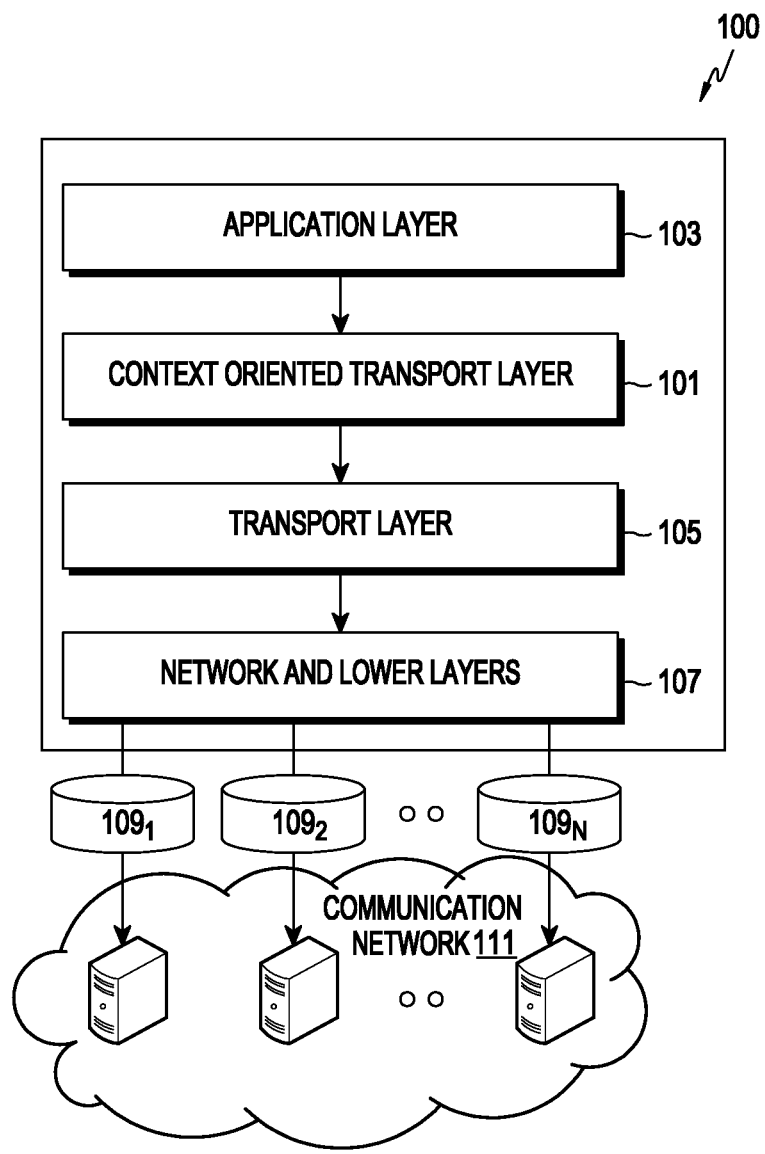
FIG. 1A is a diagram illustrating an environment for managing QoS in a communication network, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

Herein, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Embodiments of the present disclosure relate to a method and a COT layer for managing QoS in a communication network. Prioritizing traffic, which is also known as traffic shaping, is bandwidth management technique that delays flow of certain types of network packets in order to ensure network performance for higher priority applications. Traffic flow in the network environment is managed by a transport layer, which is located in between an application and network layer. However, with growing need in the computing environment, it may be expected for upcoming/next generation systems to support more diverse applications demanding their own quality characteristics for network services. Typically, in this context, current transport/network layer and communication protocols handle every application facilitated by the application layer evenly regardless of their expectations, which can be HDR, delay-sensitive and CBR. The existing layers in the network are based on layering design and best-effort paradigm, and do not provide necessary precision and adaptability required for managing QoS. Therefore, in the absence of such an ability of existing transport/network layers in the network for managing QoS, the present disclosure introduces a COT layer residing between the application layer and the transport layer in the network, which analyses application context and adapts to varying network conditions with flow based QoS management. Particularly, the COT layer is an end-to-end machine learning layer that improves underlying network capacity utilization and prioritizes traffic flows according to requirements of QoS.

Embodiments of the present disclosure have several advantages. For example, the embodiments aid in identifying connection flows that require QoS performance, and improve flow control and congestion control, thereby improving network utilization. Further, the embodiments provide an on-device solution for classifying application characteristics. Furthermore, the embodiments increase under-utilized lower-layer QoS features for traffic prioritization.

Herein, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A is a diagram illustrating an environment for managing QoS in a communication network, according to an embodiment.

As shown in FIG. 1A, an environment 100 includes a COT layer 101 residing between an application layer 103 and a transport layer 105, which is above a network and lower layers 107 in a network. Essentially, a data flow related to an application associated with a UE, is transmitted, from the application layer 103, via the different layers and one or more Internet protocol (IP) headers ($109_1$, $109_2$, $109_N$) and provided to the UE connected to a communication network 111. The plurality of data flows related to at least one application may include a plurality of connections between the UE and a network entity. The network entity facilitates a data communication and may include, but not limited to, a server, an end host, a remote host, etc. The COT layer 101 may be configured as part of existing communication layers between the UE and the network. Alternatively, the COT layer 101 may be configured as a separate layer in addition to existing communication layers.

The UE may be any computing device, such as, for example, a laptop, a desktop computer, a notebook, a smartphone, a tablet, or any other computing device. A person skilled in the art would understand that the scope of the present disclosure may encompass any other UE, not explicitly mentioned herein. The network may include, but is not limited to, a wireless network, for example, using Wireless Application Protocol (WAP), Internet, Wi-Fi, and/or the like. For example, the network may include different generations such as, for example, $2^{nd}$ generation (2G), $3^{rd}$ generation (3G), long term evolution (LTE), 5G, and $6^{th}$ generation (6G) wireless communication system.

Figure 1B:
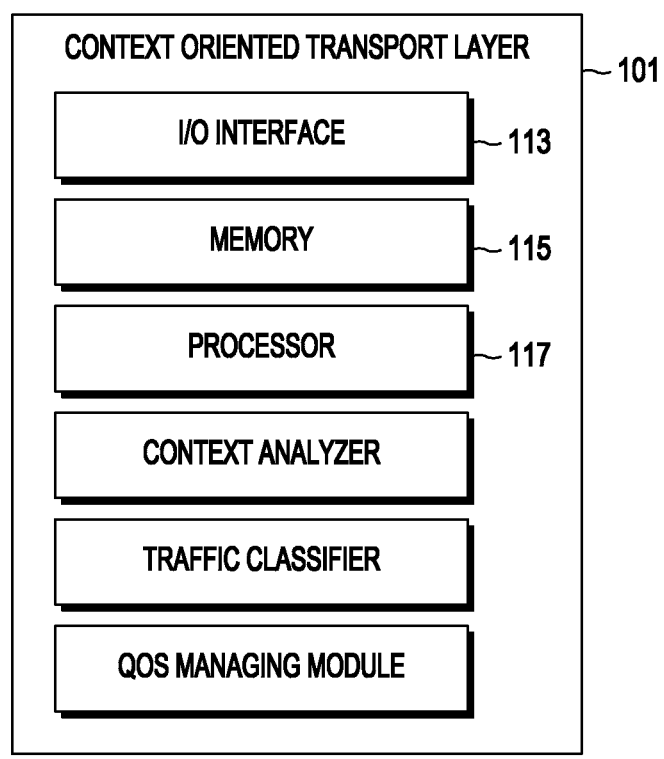
FIG. 1B is a diagram illustrating a COT layer, according to an embodiment.

The COT layer 101 is introduced in the network to manage QoS. FIG. 1B is a diagram illustrating the COT layer, according to an embodiment. The COT layer 101 provides an end-to-end approach which adopts inter-layer optimization technique to understand QoS requirements of the application layer 103 and the underlying network. The COT layer 101 may include an input/output (I/O) interface 113, a memory 115, and at least one processor 117. The I/O interface 113 may be configured to receive to a plurality of data flows related to at least one application from the application layer 103. The plurality of data flows received by the I/O interface 113 may be stored in the memory 115. The memory 115 may be communicatively coupled to the processor 117. The memory 115 may also store processor instructions that may cause the processor 117 to execute the instructions for managing QoS in the network. Further, as shown, the COT layer 101 consists of three major modules namely, a context analyzer, a traffic classifier, and a QoS managing module, which are described in greater detail in FIG. 2A.

Referring again to FIG. 1A, during a data flow having multiple connections for applications such as, for example, video streaming, interactive streaming, and the like, along with any other connection, prioritization of such a data flow for an application is important for managing QoS. Therefore, in such scenarios, the COT layer 101 is configured in the network to receive a plurality of data flows related to at least one application from the application layer 103. Further, from the received plurality of data flows, the COT layer 101 identifies at least one data flow requiring QoS management related to the at least one application by analyzing at least one of a plurality of attributes related to the at least one application. The plurality of attributes related to the at least one application data flow may include, but is not limited to, 5-tuple, connection duration, data reception, and connection frequency.

Further, the COT layer 101 classifies the identified data flow associated with the at least one application into one of a predefined QoS class. The predefined QoS class may be one of, a CBR, low-latency and high-reliability, and HDR. The COT layer 101 classifies the identified data flow using a machine learning model. The machine learning model is pretrained by using a labeled training data set related to application-related information and network information.

Training of the machine learning model is described in greater detail below. The machine learning model analyzes at least one of plurality of attributes related to the application data flow, which include, apart from the above-described, source/destination IP address, source/destination port, transport protocol, duration details of a transport layer connection, amount of data downloaded/uploaded per flow, pattern of connections establishment and termination, pattern of application's read and write from buffers, domain name associated with the flow, mapping details of dedicated port numbers to specific service and a unique application identifier (UID) for distinguishing an application, and the like.

Thereafter, based on the QoS class associated with the at least one application, the COT layer 101 prioritizes the data flow of the at least one application by dynamically sizing TCP receive and send windows, congestion and flow control parameters, and utilizing type of service (ToS) bits of IP header for improving QoS.

The COT layer 101 may evaluate network capabilities based on real-time signal and transmissions parameters and may allocate resources for fulfilling QoS conditions.

The network condition is evaluated upon classifying the plurality of data flows related to at least one application into one of the QoS class. The evaluation of the network condition includes assessing a current network condition using one or more parameters such as, but not limited to, type of radio access technology (RAT), received signal strength indicator (RSSI) for received Wi-Fi signal power measurement, arbitrary strength unit (ASU) (i.e., a measurement of the received power level in an LTE cell network) power details, channel quality indicator (CQI) details, service set identifier (SSID) details, bandwidth available to UE, round-trip time (RTT) of the network, and packet loss ratio. Based on the classified QoS class and network conditions, parameters of transport layer 105 are configured in the network for the plurality of data flow related to at least one application.

The parameters of the transport layer 105 are configured by modifying at least one of, a TCP receive buffer, a TCP congestion window, an initial receive window, an initial congestion window, a slow-start threshold, a congestion control parameters as per classified QoS class based on network capability and setting differentiated service code point (DSCP) bits in IP layer to correspond to the QoS class and signaling the DSCP bits to corresponding peer entity. Setting of the DSCP bits corresponds to high data rate (HDR): 3rd bit to 1, low latency: 4th bit to 1, high reliability: 2nd bit 1. Accordingly, the transport layer 105 is operated for the at least one application based on the configured parameters. Further, the COT layer 101 may validate the QoS class after modifying parameters associated with transport layer 105 by monitoring the plurality of data flows and re-evaluating the QoS classification.

In an alternate implementation, a QoS enhancement is provided for a UE in a communication system. The QoS enhancement includes determining QoS requirements of each application running in the UE and configuring the COT layer 101 between the UE and the network for varying the data flow for each application with reference to QoS requirements for the application.

Figure 1C:
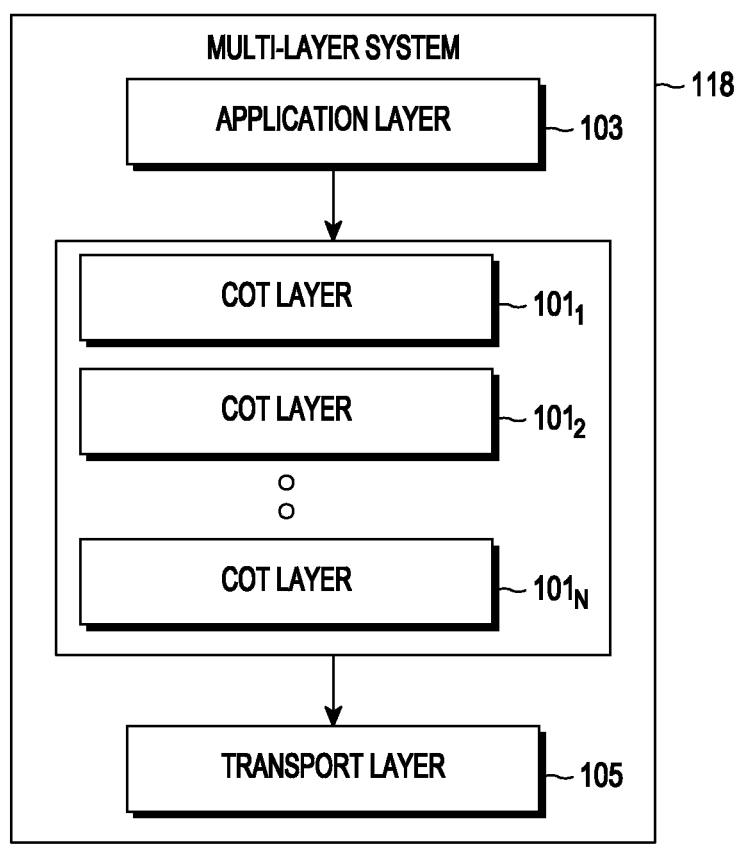
FIG. 1C is a diagram illustrating a multi-layer system for wireless communication, according to an embodiment.

In an alternate implementation, a multi-layer system for wireless communication is provided. FIG. 1C is a diagram illustrating a multi-layer system 118 having the transport layer 105, the application layer 103 and at least one COT layer ($101_1$, $101_2$, ... $101_N$) between the transport layer 105 and the application layer 103 to vary the data flow for a plurality of applications with reference to predefined QoS requirements for each application. The QoS defined for each application is based on a context of communication.

Figure 2A:
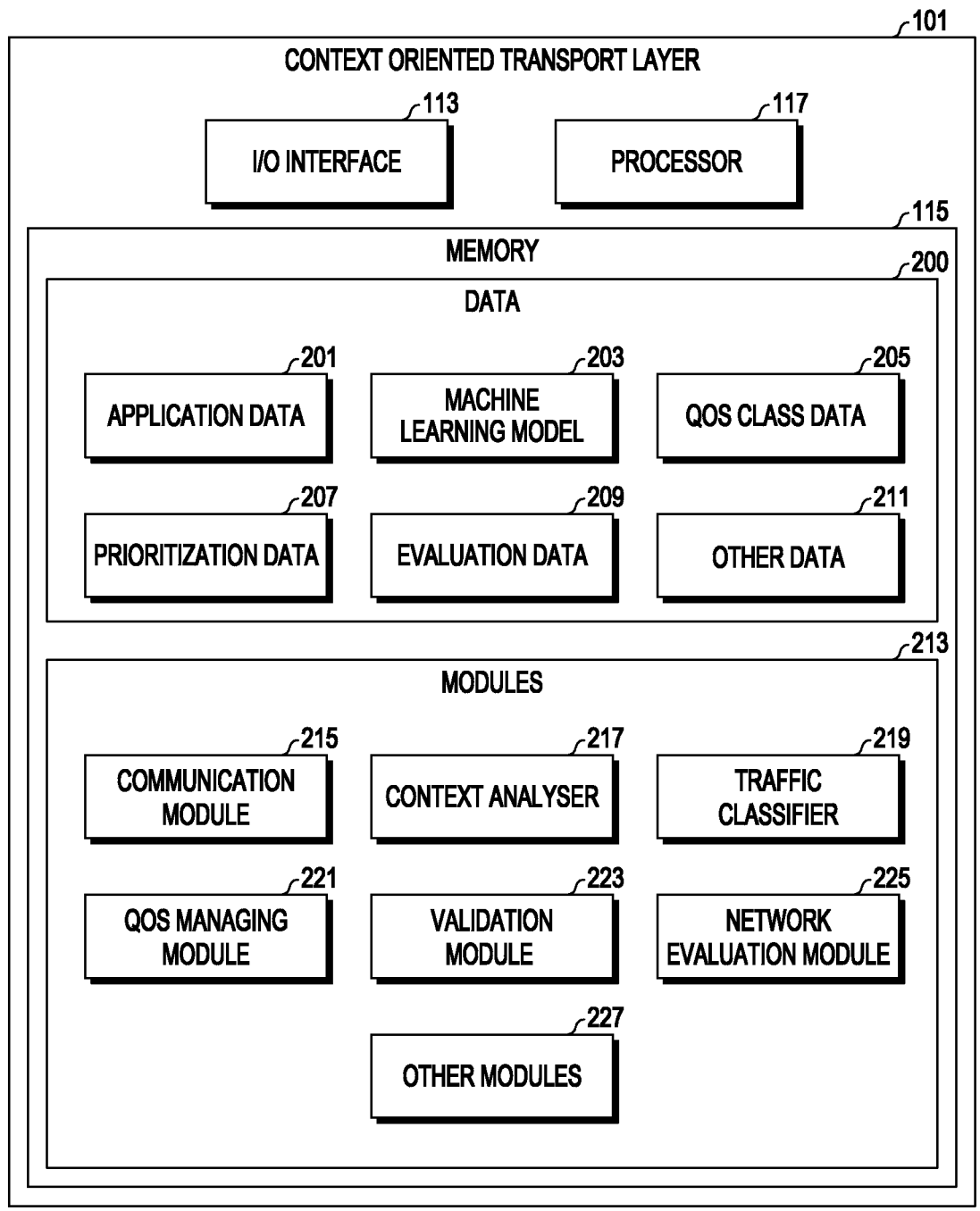
FIG. 2A is a diagram illustrating a COT layer, according to an embodiment.

FIG. 2A is a diagram illustrating a COT layer, according to an embodiment.

The COT layer 101 includes data 200 and one or more modules 213. The data 200 is stored within the memory 115. The data 200 may include, for example, application data 201, a machine learning model 203, QoS class data 205, prioritization data 207, evaluation data 209, and other data 211.

The application data 201 may include the plurality of data flows related to at least one application associated with the UE. Further, the application data 201 include details of the plurality of attributes related to the at least one application. The attributes include five-tuple (source/destination IP address, source/destination port, transport protocol), connection duration, data reception, connection frequency, duration details of a transport layer connection, amount of data downloaded/uploaded per flow, pattern of connections establishment and termination, pattern of application's read and write from buffers, domain name associated with the flow, mapping details of dedicated port numbers to specific service, and a UID for distinguishing an application.

The machine learning model 203 is a pretrained artificial intelligence (AI) model used for classifying identified data flow associated with the at least one application into one of a predefined QoS class. The machine learning model 203 is based on a decision tree, group of decision trees, and/or random forest technique.

The QoS class data 205 may include details of applications classified under type of class such as, for example, a CBR, a low-latency and high-reliability and HDR.

The prioritization data 207 may include information regarding sizing of TCP receive and send windows, congestion, and flow control parameters and ToS bits of IP header.

The evaluation data 209 may include information of one or more parameters for assessing a current network condition such as, for example, the type of RAT, the RSSI for received Wi-Fi signal power measurement, ASU power details, CQI details, SSID details, bandwidth available to UE, RTT of the network, and packet loss ratio.

The other data 211 may store data, including temporary data and temporary files, generated by modules 213 for performing the various functions of the COT layer 101.

The data 200 in the memory 115 is processed by the one or more modules 213 present within the memory 115 of the COT layer 101. The one or more modules 213 may be implemented as dedicated units. As used herein, the term module refers to an application specific integrated circuit (ASIC), an electronic circuit, a field-programmable gate arrays (FPGA), programmable system-on-chip (PSoC), a combinational logic circuit, and/or other suitable components that provide the described functionality. In some implementations, the one or more modules 213 may be communicatively coupled to the processor 117 for performing one or more functions of the COT layer 101. The modules 213, when configured with the functionality defined herein, will result in a novel hardware.

The one or more modules 213 may include, but are not limited to, a communication module 215, a context analyzer 217, a traffic classifier 219, a QoS managing module 221, a validation module 223, and a network evaluation module 225. The one or more modules 213 may also include other modules 227 to perform various miscellaneous functionalities of the COT layer 101. The other modules 227 may include a training module, a configuration module. The training module may train the machine learning model 203 by using a labeled training data set related to application-related information and network information.

Figure 3A:
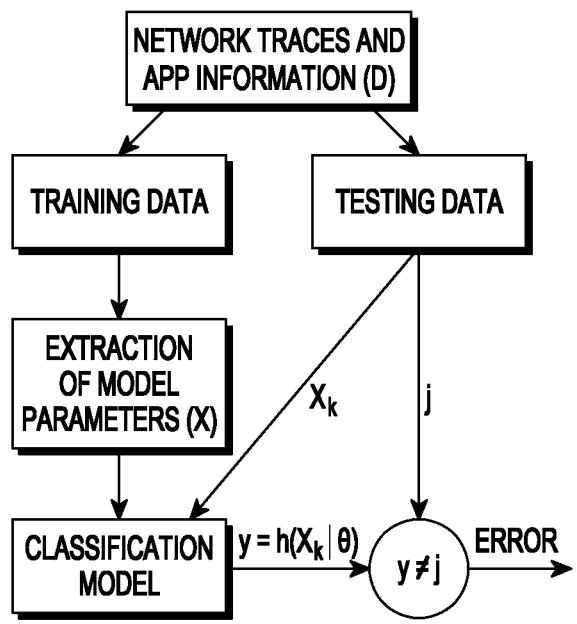
FIG. 3A is a diagram illustrating training of a machine learning model, according to an embodiment.

FIG. 3A is a diagram illustrating training of a machine learning model, according to an embodiment. As shown, labeled training data is collected and classification performance is evaluated by dividing a dataset into two parts, where an initial predefined amount (25 percent) of data constitutes a training data set for training the machine learning model 203, and the remaining is used for testing prediction accuracy of the trained machine learning model 203.

The performance of the machine learning model 203 using the data set with application-related information, network traces and radio layer information is evaluated. The dataset may consist of network traces including transport 105 and network layer 107 protocol packets of various applications 103. These applications may belong to various QoS classes.

FIG. 3A is a diagram illustrating a prediction methodology, where the data set 209 gets divided into training and testing parts. During the validation phase, outputs are predicted using the inputs (the test data) and, the error between predicted and actual values is calculated. As given in FIG. 3B, train split will be used for building the model and test split will be used for validating the model. The mean absolute percentage error (MAPE) is one of the most widely used measures of forecast accuracy due to its scale independent and easily interpretable nature.

Figure 3B:
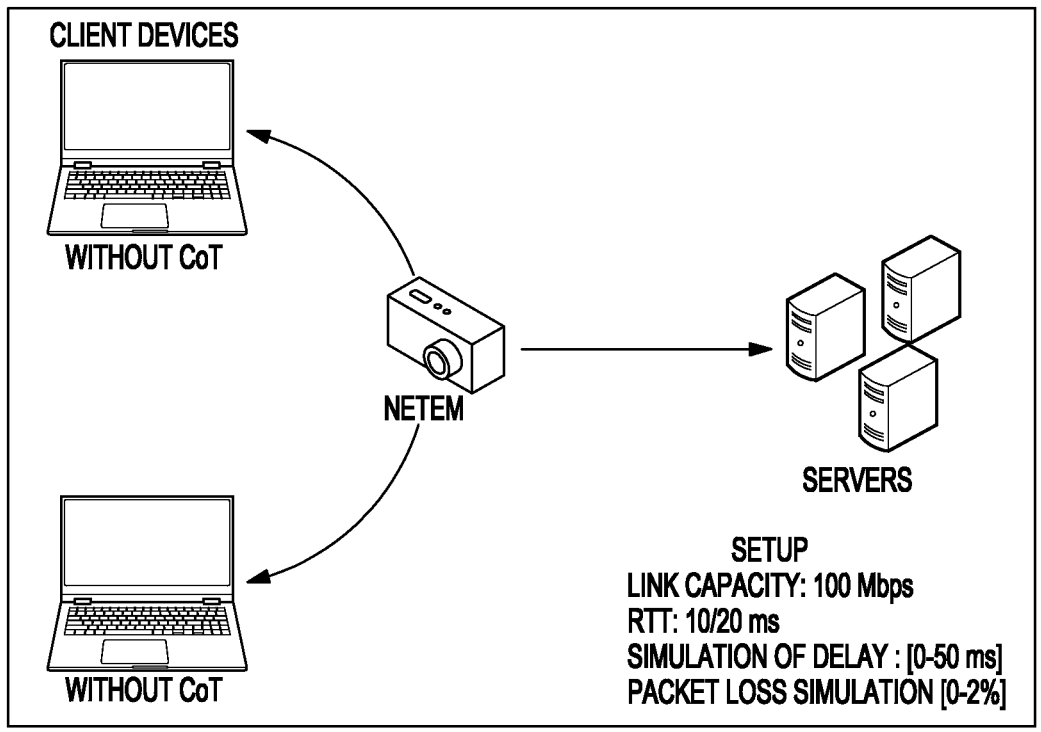
FIG. 3B is a diagram illustrating an emulated traffic setup for performance evaluation, according to an embodiment.

FIG. 3B is a diagram illustrating an emulated traffic setup for performance evaluation, according to an embodiment. As shown, an emulated traffic setup is disclosed for performance evaluation. End-devices are configured with/without the COT layer 101 and traffic emulation is performed for evaluating various network conditions.

The CoT layer 101 in a Linux environment with Ubuntu 18.04 has been prototyped and deployed in end-devices for performance evaluation. The emulation setup is configured using network emulator (NetEm) for performing traffic shaping, as shown in FIG. 3B. NetEm is a tool used for regulating packet losses and delay into network traffic with traffic-control (tc) utility. As the network conditions vary with delay, packet loss, and available throughput, the performance of the CoT layer 101 also varies in terms of throughput improvement and latency reduction. Multiple network scenarios are configured by varying link delay from 0 to 50 ms and packet loss ratio from 0 to 2%, and conducted experiments to evaluate QoS improvements.

Returning to FIG. 2A, the configuration module may configure parameters of the transport layer 105 in the network for the plurality of data flows related to at least one application based on the classified QoS class and network conditions. Particularly, the configuration module may configure parameters of the transport layer 105 by modifying at least one of, the TCP receive buffer, the TCP congestion window, the initial receive window, the initial congestion window, the slow-start threshold, and the congestion control parameters as per classified QoS class based on network capability, and may set the DSCP bits in IP layer to correspond to the QoS class and signaling the DSCP bits to corresponding peer entity. Setting of the DSCP bits corresponds to HDR 3rd bit to 1, low latency: 4th bit to 1, high reliability: 2nd bit 1. Consequently, the configuration module operates the transport layer 105 for the at least one application based on the configured parameters.

The communication module 215 may receive the plurality of data flows related to at least one application from the application layer 103 in the network.

The context analyzer 217 identifies at least one data flow requiring QoS management related to the at least one application by analyzing at least one of a plurality of attributes related to the at least one application. The plurality of attributes include five-tuple (source/destination IP address, source/destination port, transport protocol), connection duration, data reception, connection frequency, duration details of a transport layer connection, amount of data downloaded/uploaded per flow, pattern of connections establishment and termination, pattern of an application's read and write from buffers, domain name associated with the flow, and mapping details of dedicated port numbers to a specific service and a UID for distinguishing an application.

The traffic classifier 219 may classify the identified data flow associated with the at least one application into one of the predefined QoS class using the machine learning model 203. Particularly, the machine learning model 203 may first predict the nature of an application and classify the at least one application into various types such as, for example, multi-level connections (e.g., VR), varying QoS applications (such as, online gaming), and communication fidelity applications (e.g., teleportation). The communication fidelity refers to the ability of the receiver to produce an exact replica of transmitted signal. The teleportation refers to holographic telepresence, a use case to connect remotely with increasing fidelity. Unlike network nodes, which follow network traffic forecasting methods, end-devices are capable of accessing and analyzing many more flow attributes, including the client application information. Consequently, the machine learning model 203 may analyze the at least one of the plurality of attributes related to the application data flow and classifies the identified data flow into the QoS class.

Figure 3C:
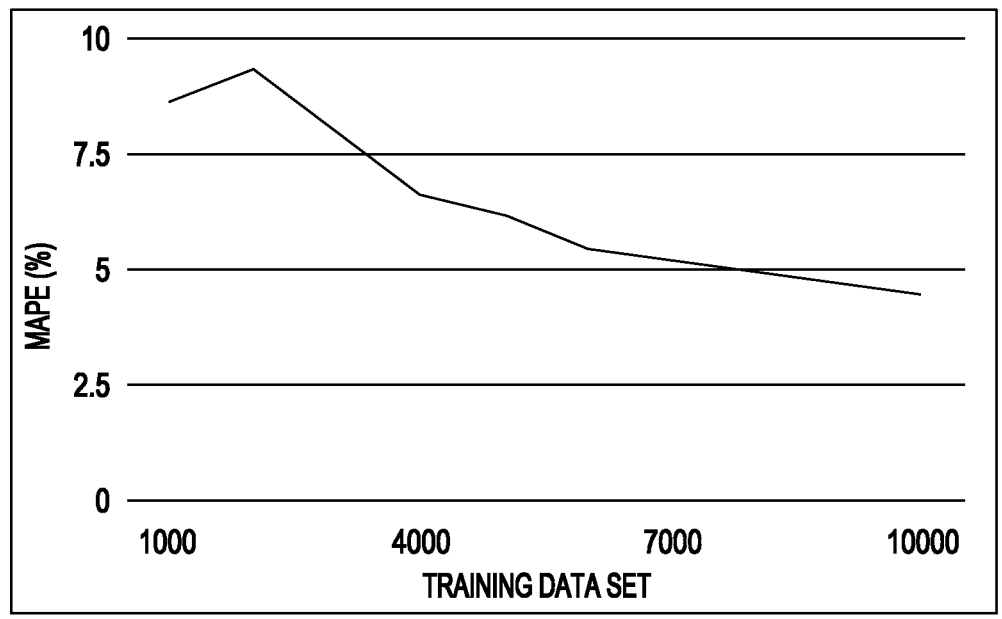
FIG. 3C is a graph showing a mean absolute percentage error (MAPE) of a machine learning model, according to an embodiment.
Figure 3D:
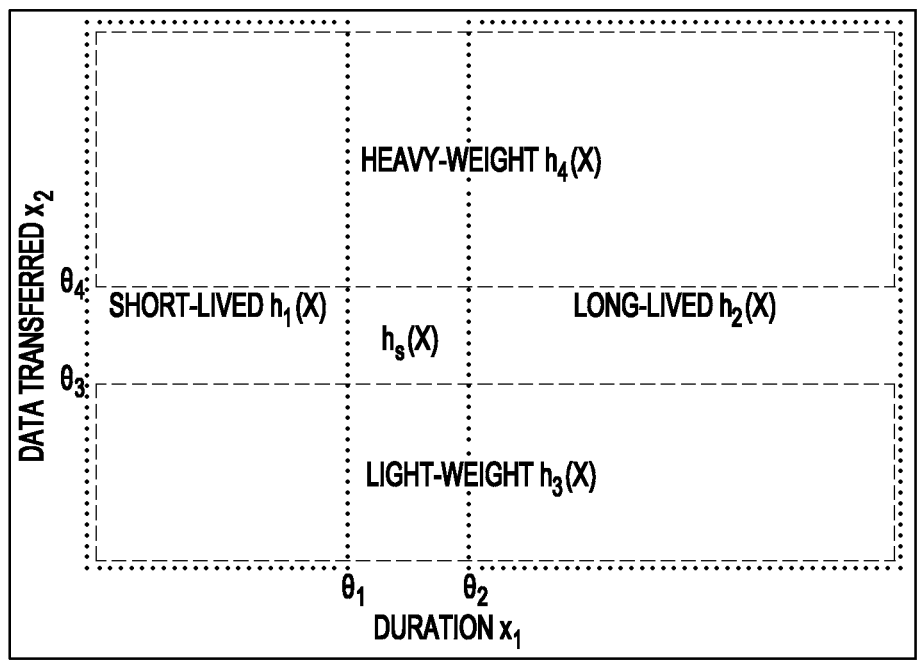
FIG. 3D is a graph showing a partition of a two-dimensional feature using a machine learning model for intermediate classification of traffic, according to an embodiment.

The predefined QoS class may include the CBR, the low-latency and high-reliability, and the HDR. The CBR refers to a category of applications that are relatively more concerned with timely arrival of data consistently than guaranteed delivery. The COT layer 101 may control the transport layer buffer parameters of CBR flows for obtaining the constant data rate. When the data flow is classified under low-latency class, the COT layer 101 may ignore default RTT wait time for the low-latency flow and pass the data packet immediately to the lower layer and sets corresponding IP header. The high reliability class may indicate the services that may not tolerate packet losses and require very high reliability. FIG. 3C is a graph showing MAPE of machine learning model, according to an embodiment. A MAPE of the machine learning model 203 is shown for classification. For example, when there is a misclassification of a flow into wrong QoS class, error as E=1 is considered. The machine learning model 203 includes a MAPE of 4.5% to 9.4% when using a data set of up to 10,000 entries with all the QoS classes. FIG. 3D is a graph showing a partition of a two-dimensional feature using machine learning model for intermediate classification of traffic, according to an embodiment. In the machine learning model 203, a plurality of decision trees, with various classifiers similar to a random forest method, are used for the creation of the QoS class as outcome. As shown, consider a given data set "D" of size "n" as shown in Equations (1)-(6) below.

Let us consider a given data set D with size n $$D=\{(\vec{X}_1,y_1),(\vec{X}_2,y_2),\ldots,(\vec{X}_n,y_n)\}$$

Where, $\vec{X}_1$ be the feature vector and y be the predicted outcome, which is drawn from a probability distribution $(\vec{X}_i, y_i) \sim (\vec{X}, y)$. Each feature vector contains the set of features used for defining the Decision Tree $$\vec{X}_k=\{x_{k1},x_{k2},\ldots x_{kp}\}$$

The classifier h, which predicts y from $\vec{X}$ based on the data set of examples D, can be represented as an ensemble of classifiers.

$$h=\{h_1(\vec{X}),h_2(\vec{X}),\ldots h_K(\vec{X})\}$$

We define the parameters of each decision tree $h_K(\vec{X})$ to be $$\theta_k=\{\theta_{k1},\theta_{k2},\ldots \theta_{kp}\}$$

Hence, $h_K(\vec{X})$ can also be represented as $h_K(\vec{X})|\theta_k$

Let y be a QoS class which is generated as the outcome of the classification model. Hence, the empirical probability for the QoS class y occurs can be represented as $\hat{P}(y)$=Proportion of classifier $h_K$(1≤k≤K) (1 for which y event occurs $$\hat{P}(y)=\hat{P}_k(h_k(\vec{X}|\theta_k=y))$$

The margin function $\hat{m}$ for the classifiers in parameter space $\theta_k$ is a function from $(\vec{X}, y)$.

$$\hat{m}(\vec{X}, y) = \hat{P}_k\left(h_k\left(\vec{X} \mid \theta_k = y\right)\right) - \max_{j \neq y}\hat{P}_k\left(h_k\left(\vec{X} \mid \theta_k = j\right)\right)$$

The margin function $\hat{m}(\vec{X}, y)$ indicates the capability for correctly classifying $(\vec{X}, y)$ by majority voting using the given classifiers. Moreover, it also reflects the confidence in the classification. The larger the margin, the more the confidence.

Figure 4A:
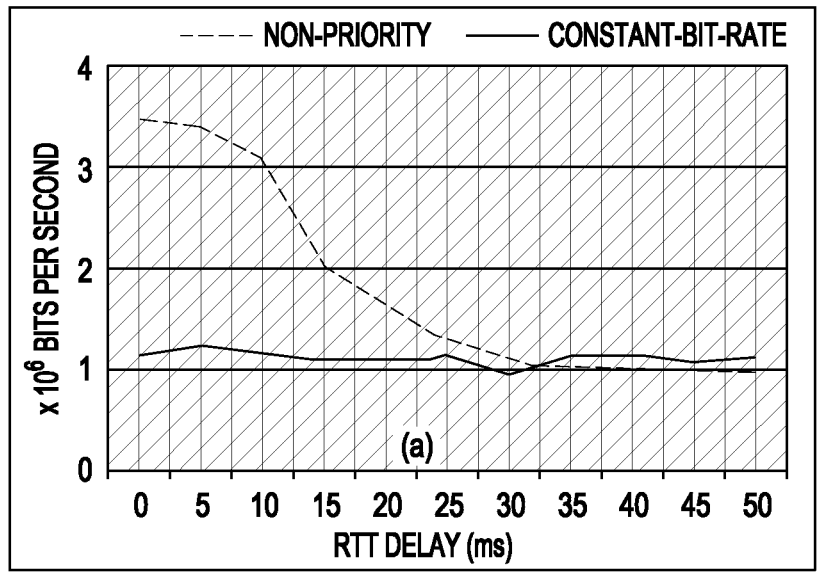
FIGS. 4A, 4B, and 4C are graphs showing performance metrics of various QoS classes, according to an embodiment.
Figure 4B:
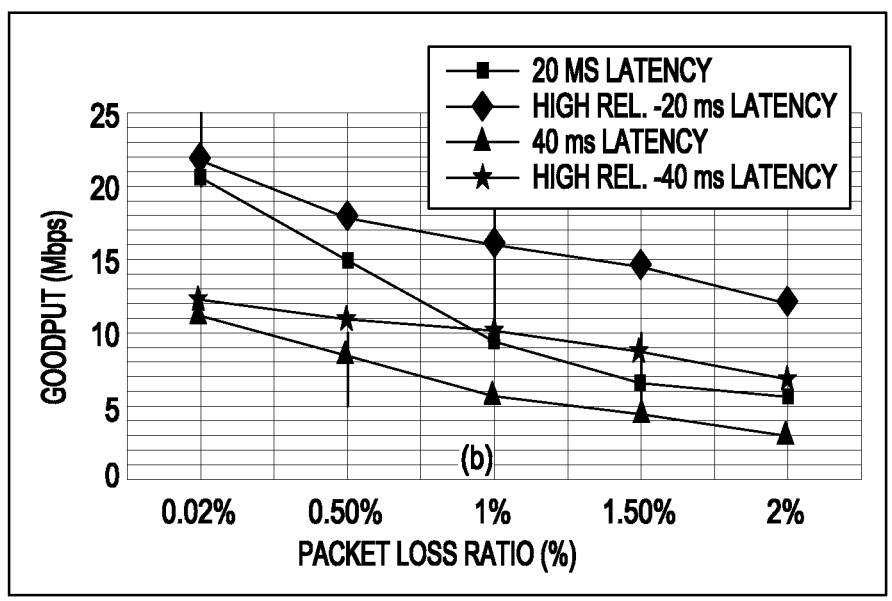
Figure 4C:
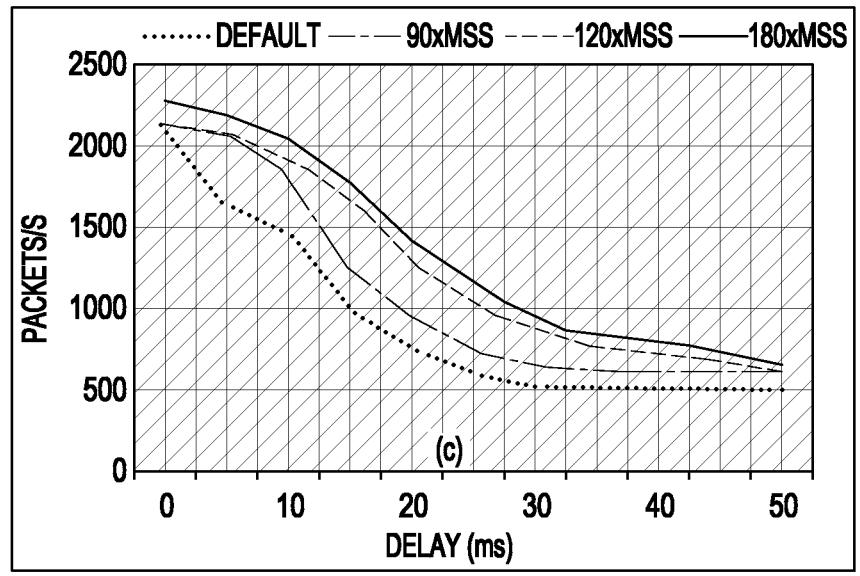

FIGS. 4A-4C are graphs showing performance metrics of various QoS classes, according to an embodiment. As shown in FIG. 4A, a data rate comparison of CBR and a default flow is illustrated. The transport layer buffer parameters of a default flow are regulated for obtaining constant bit rate. Likewise, in FIG. 4B, latency reduction for high reliability flows during network packet loss conditions is illustrated. The COT layer 101 minimizes the impact of network conditions and improves the throughput by 40 percent. Also, in FIG. 4C, the COT layer 101 may modify the buffer parameters, and configures with high initial receive windows to improve the data rate for HDR flows.

Returning to FIG. 2A, the QoS managing module 221 may prioritize the data flow of the at least one application based on the classified QoS class for the at least one application. Particularly, the QoS managing module 221 prioritizes the data flow of the at least one application by dynamically sizing TCP receive and send windows, congestion and flow control parameters, and utilizing ToS bits of IP header for improving QoS.

Figure 5A:
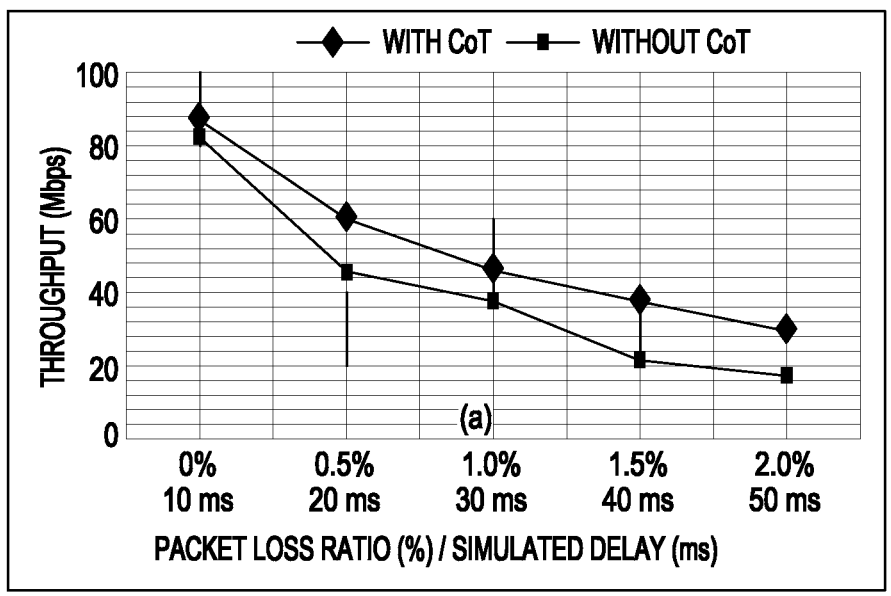
FIGS. 5A, 5B, and 5C are graphs showing an impact on end-user experience improvement, according to an embodiment.
Figure 5B:
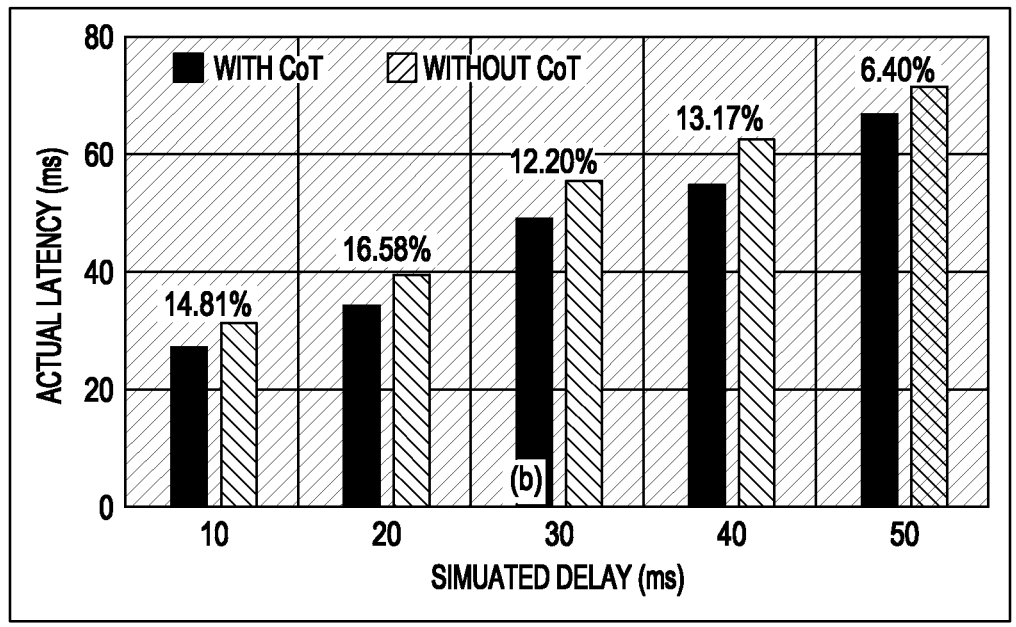
Figure 5C:
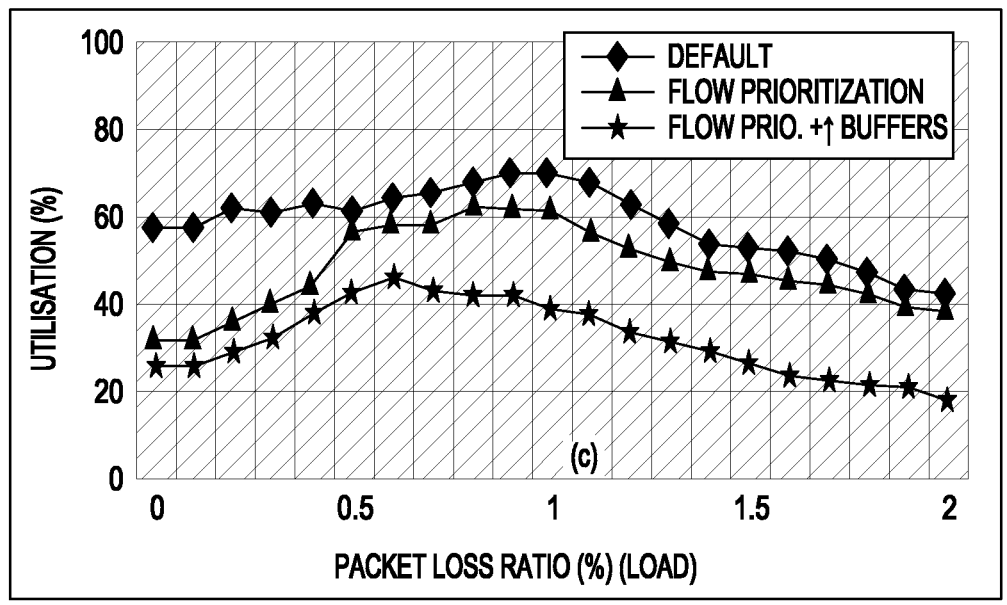

FIGS. 5A-5C are graphs showing an impact on end-user experience improvement, according to an embodiment. FIG. 5A is a graph showing an analysis of HDR and CBR flows during a lossy network state with link delay. In such case, the COT layer 101 may minimizes the drop in data-rate. Likewise, FIG. 5B is a graph showing an actual latency comparison of high-reliability and latency-sensitive flows with delay simulation. In such case, the COT layer 101 may reduce user-perceived latency for improving the reliability even during worst network conditions. FIG. 5C is a graph showing a packet loss ratio. The COT layer 101 in such scenario may ensure optimal bandwidth utilization on an average up to 30% for satisfying the QoS requirements even during high end-to-end delay and congestion.

Figure 5D:
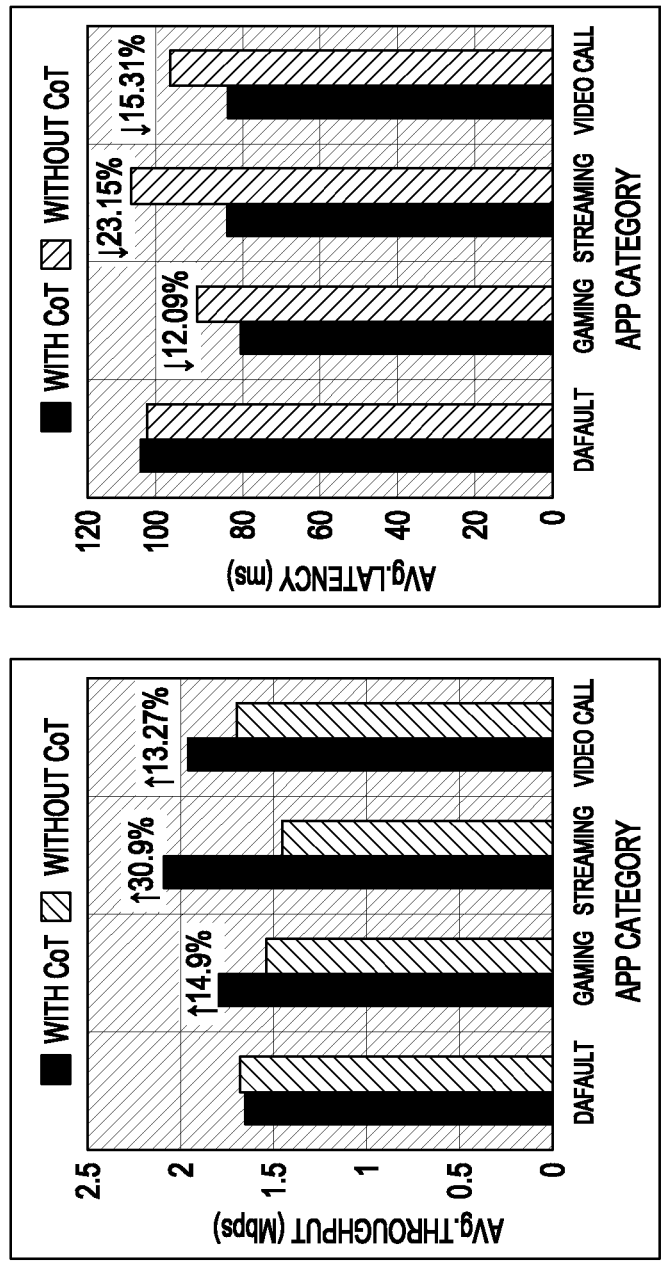
FIG. 5D is a graph showing a performance evaluation using live-air network, according to an embodiment.

FIG. 5D is a graph showing a performance evaluation using a live-air network, according to an embodiment. In such scenario, for instance, the COT layer 101 may improve the throughput of various QoS classes by up to 30.9%, and reduce the average latency by up to 23.15%, when compared with a default platform using an LTE live-air network.

Returning to FIG. 2A, the validation module 223 may validate the classified QoS class after modifying parameters associated with transport layer 105 by monitoring the plurality of data flows and re-evaluating the QoS classification.

The network evaluation module 225 may evaluate the network capabilities based on real-time signal and transmissions parameters and may allocate resources for fulfilling QoS conditions.

The network condition is evaluated upon classifying the plurality of data flows related to at least one application into one of the QoS class. Particularly, the network evaluation module 225 may evaluate the network condition by assessing a current network condition using the one or more parameters such as, but not limited to, type of RAT, RSSI for received Wi-Fi signal power measurement, ASU power details, CQI details, SSID details, bandwidth available to UE, RTT of the network, and packet loss ratio. Based on the classified QoS class and network conditions, parameters of transport layer are configured in the network for the plurality of data flows related to at least one application.

Figure 6:
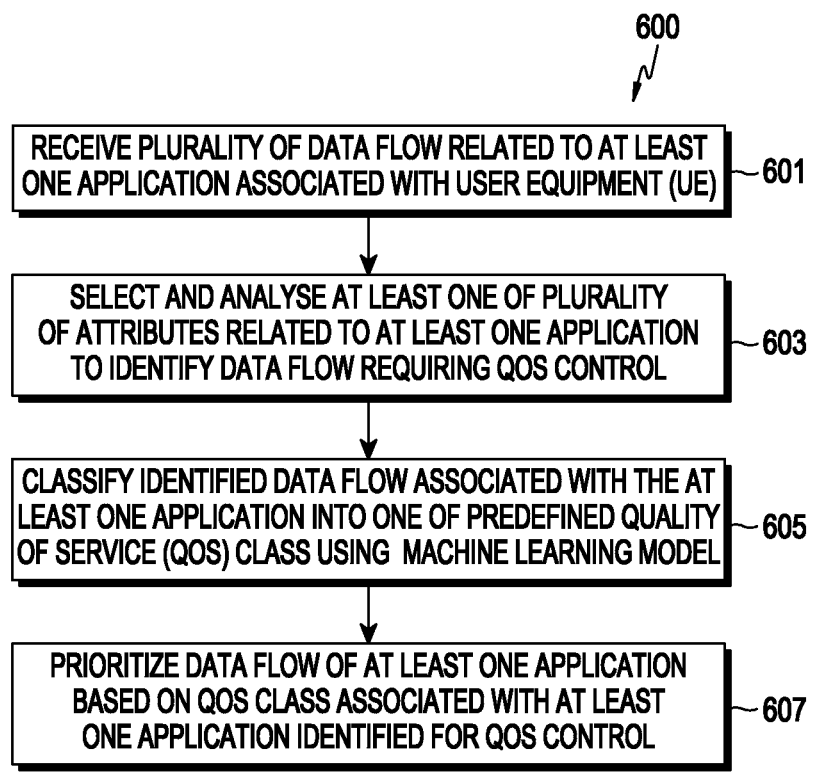
FIG. 6 is a flowchart illustrating a method for managing QoS in a communication network, according to an embodiment.

FIG. 6 is a flowchart illustrating a method for managing QoS in a communication network, according to an embodiment.

As illustrated in FIG. 6, a method 600 includes one or more blocks for managing QoS in a communication network. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 601, the plurality of data flows is received by the communication module 215 of the COT layer 101, from the application layer 103 in the network, related to the at least one application associated with the UE.

At 603, the at least one data flow requiring QoS management is identified by the context analyzer 217 related to the at least one application, based on analyzing the at least one of a plurality of attributes related to the at least one application.

At 605, the identified data flow associated with the at least one application is classified by the traffic classifier 219 into one of the predefined QoS classes using the machine learning model 203.

Figure 2B:
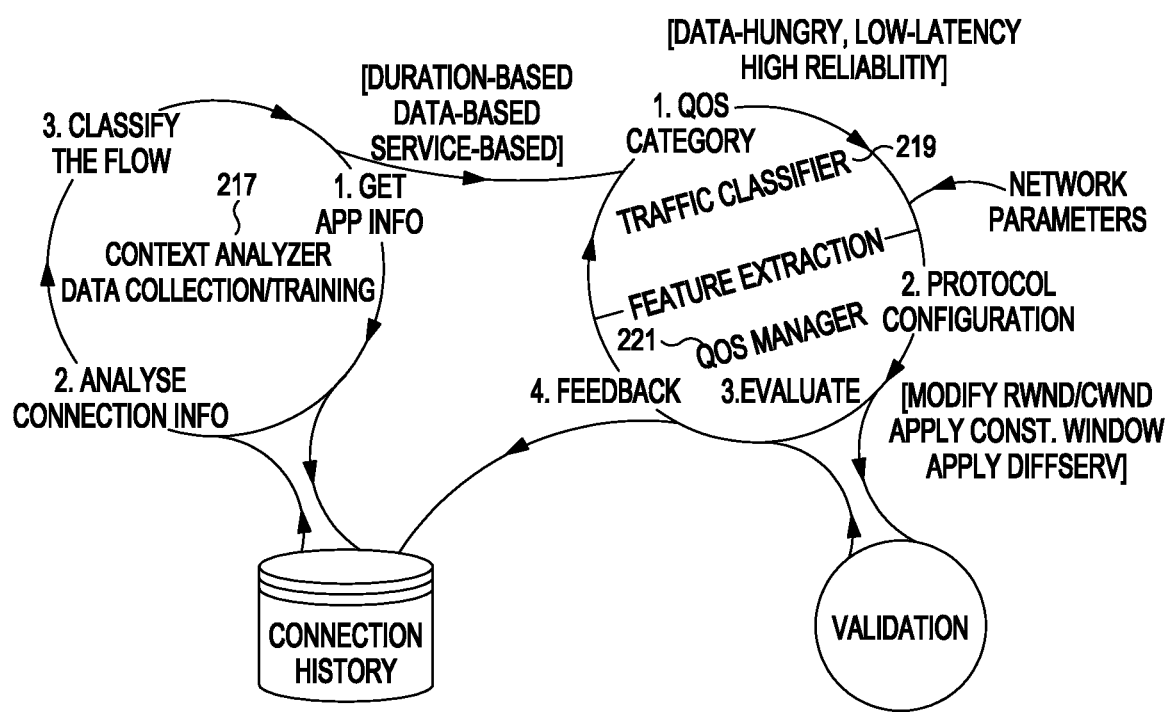
FIG. 2B is a flowchart illustrating a method for managing QoS, according to an embodiment.

At 607, the data flow of the at least one application is prioritized by the QoS managing module 221 based on the QoS class associated with the at least one application. The prioritizing of the data flow of the at least one application includes dynamically sizing TCP receive and send windows, congestion and flow control parameters and utilizing ToS bits of IP header for improving QoS. FIG. 2B shows an operational flowchart for managing QoS in a communication network, according to an embodiment.

Context analyzer 217 Provides inter-layer awareness. The context analyzer 217 follows a cross-layer mechanism to monitor the application-level and transport layer flow-level characteristics. Also, it collects the real-time connection interface and network attributes from lower layers for assessing the network condition. Thus, Context Analyzer aims to bridge the gap between the upper and lower layers of the transport layer.

Traffic classifier 219 composes application context. The traffic classifier 219 performs traffic classification and forms QoS classes with various quality requirements according to the application behavior. As shown in FIG. 2B, it uses the application/flow characteristics provided by the context analyzer 217 as input (~X) and generates the QoS classes as output ($y=h(\sim X)$) (refer to Section 5.2). Hence, the traffic classifier 219 makes the transport layer 105 capable of understanding the flow context.

QoS manager 221 achieves Fine-grained Quality-of-Service. The QoS manager 221 utilizes the QoS classes created by Traffic Classifier 219 (y) and evaluates the network condition using the context analyzer's 217 lower-layer attributes 211 (~W). Based on the network capability evaluation, it decides the flow control parameters for enhanced quality control and flow prioritization ($zk=f(y; \sim W)$). Thus, the QoS manager 221 overrides the drawbacks of best-effort paradigm and casts the first stone for the next-generation transport layer.

An end UE device may include four data flows, in which one is an interactive streaming section and the remaining three are normal (best-effort) flows. In such situation, existing network layers (i.e., the transport layer) may treat every flow equally with the same configuration for congestion and flow control, without any traffic shaping. However, the COT layer 101 described herein may analyze a data flow of the four applications and identify the QoS class (HDR/low latency/CBR etc.), assess network capacity, modify protocol configuration, regulate flow/congestion control, and prioritize the flows to achieve flow-based QoS management for better user experience.

Figure 7:
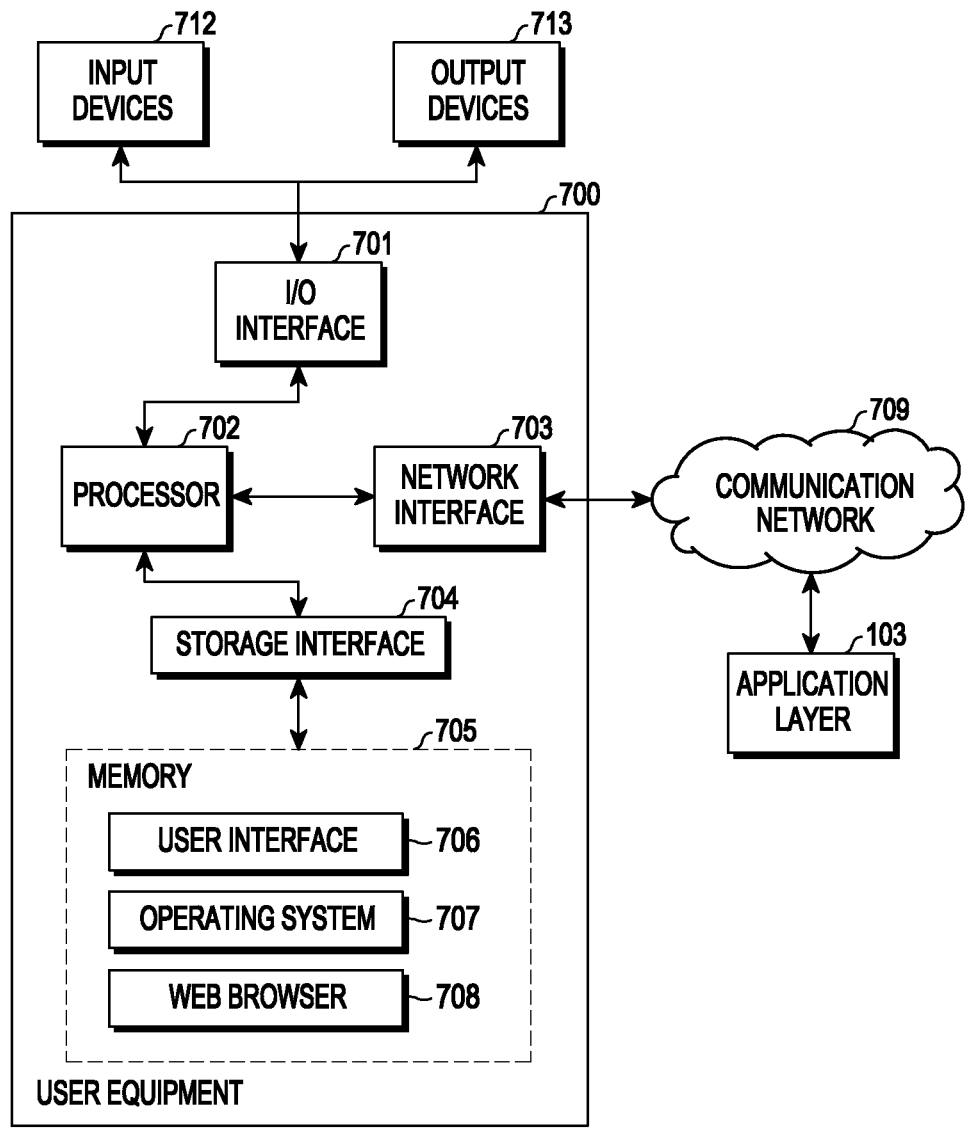
FIG. 7 is a block diagram illustrating a UE, according to an embodiment.

FIG. 7 is diagram illustrating UE, according to an embodiment.

A UE 700 includes a central processing unit (CPU) (or "processor") 702. The processor 702 may include at least one data processor for managing QoS in a communication network. The processor 702 may include specialized processing units such as, for example, integrated system (bus) controllers, memory management control units, floating point units, graphics processing units, digital signal processing units, etc.

The processor 702 may be disposed in communication with one or more I/O devices via an I/O interface 701. The I/O interface 701 may employ communication protocols/methods such as, without limitation, audio, analog, digital, monoaural, Radio Corporation of America (RCA), stereo, Institute of Electrical and Electronics Engineers (IEEE)-1394, serial bus, universal serial bus (USB), infrared, person system/2 (PS/2), Bayonet Neill-Concelman (BNC), coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), LTE, WiMax, or the like), etc.

Using the I/O interface 701, the UE 700 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The processor 702 may be disposed in communication with a communication network 709 via a network interface 703. The network interface 703 may communicate with the communication network 709. The network interface 703 may employ connection protocols including, without limitation, direct connect, Ethernet (e.g., twisted pair 10/100/1000 Base T), TCP/IP, token ring, IEEE 802.11a/b/g/n/x, etc. The communication network 709 may include, without limitation, a direct interconnection, local area network (LAN), wide area network (WAN), wireless network (e.g., using WAP), the Internet, etc. Using the network interface 703 and the communication network 709, the UE 700 may communicate with application layer 103. The network interface 703 may employ connection protocols including, but not limited to, direct connect, Ethernet (e.g., twisted pair 10/100/1000 base T), TCP/IP, token ring, IEEE 802.11a/b/g/n/x, etc.

The communication network 709 includes, but is not limited to, a direct interconnection, an e-commerce network, a peer to peer (P2P) network, LAN, WAN, wireless network (e.g., using WAP), the internet, Wi-Fi, and such. The first network and the second network may either be a dedicated network or a shared network, which represents an association of the different types of networks that use a variety of protocols, for example, hypertext transfer protocol (HTTP), TCP/IP, WAP, etc., to communicate with each other. Further, the first network and the second network may include a variety of network devices, including routers, bridges, servers, computing devices, storage devices, etc.

The processor 702 may be disposed in communication with a memory 705 (e.g., random access memory (RAM), read only memory (ROM), etc., not shown in FIG. 4) via a storage interface 704. The storage interface 704 may connect to memory 705 including, without limitation, memory drives, removable disc drives, etc., employing connection protocols such as, serial advanced technology attachment (SATA), integrated drive electronics (IDE), IEEE-1394, USB, fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 705 may store a collection of program or database components, including, without limitation, a user interface 706, an operating system 707 etc. In some embodiments, UE 700 may store user/application data, such as, the data, variables, records, etc., as described in this disclosure. Such databases may be implemented as fault-tolerant, relational, scalable, secure databases.

The operating system 707 may facilitate resource management and operation of the UE 700.

The UE 700 may implement a web browser 708 stored program component. The web browser 708 may be a hypertext viewing application. Secure web browsing may be provided using secure hypertext transport protocol (HTTPS), secure sockets layer (SSL), transport layer security (TLS), etc. The UE 700 may implement a mail server stored program component. The UE 700 may implement a mail client stored program component.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, non-volatile memory, hard drives, compact disc (CD) ROMs, digital versatile discs (DVDs), flash drives, disks, and any other known physical storage media.

On-device AI-based learning module is provided for classifying application characteristics.

Connection flows that need QoS performance are identified. TCP, UDP, multipath TCP (MPTCP), stream control transmission protocol (SCTP) and QUIC protocols are supported.

Flow control and congestion control of TCP-like protocols are improved.

The network utilization is improved.

Backward compatibility with existing protocols is provided.

Embodiments are transparent to applications, application-agnostic, service-agnostic, and protocol-agnostic.

Under-utilized lower-layer QoS features, like differentiated services (DiffServ), are increased for traffic prioritization. The DiffServ refers to a computer networking architecture which specifies a scalable mechanism for classifying and managing network traffic and providing QoS on modern IP networks. DiffServ uses a 6-bit differentiated services code point (DSCP) in the 8-bit differentiated services (DS) field in the IP header for packet classification purposes.

Implementation is only required at the device side, solving the technical problem of lack of QoS at the transport layer, which may be essential for upcoming critical beyond 5G (B5G) and 6G services.

A flow-based traffic shaping mechanism is provided, which dynamically modifies transport layer parameters based on precise QoS requirement. The COT layer enables the transport layer to adapt as per the changing needs.

AI/ML models are used for identifying QoS for which very high accuracy can be achieved based on realistic training set.

Complexities and overhead are reduced by eliminating any changes on server side for traffic prioritization and QoS management.

A flow-based traffic shaping mechanism is provided, which dynamically modifies transport layer parameters based on precise QoS requirement.

An end-to-end solution is provided which is compatible with majority of existing transport layer protocols and does not require any change in middle boxes or network infrastructures.

Effective methodologies for ML-based traffic classification, flow prioritization and QoS enhancements are used at the transport layer.

QoS performance is improved significantly, which results in reduced latency by up to for example, fourteen percent, and improved throughput up to thirty percent.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., electrically erasable programmable ROMs (EEPROMs), ROMs, programmable ROMs (PROMs), RAMs, dynamic RAMs (DRAMs), static RAMs (SRAMs), Flash Memory, or firmware, programmable logic), etc. Further, non-transitory computer-readable media include all computer-readable media except for a transitory. The code implementing the described operations may further be implemented in hardware logic (e.g., an integrated circuit chip, programmable gate array (PGA), ASIC, etc.).

Still further, the code implementing the described operations may be implemented in transmission signals, where transmission signals may propagate through space or through a transmission media, such as, for example, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An article of manufacture includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean one or more (but not all) embodiments of the invention(s) unless expressly specified otherwise.

The terms "including", "comprising", "having" and variations thereof mean including, but not limited to, unless expressly specified otherwise.

The enumerated listing of items does not imply that any or all of the items are mutually exclusive, unless expressly specified otherwise.

The terms "a", "an" and "the" mean one or more, unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for managing quality of service (QOS) in a communication network, comprising:
    receiving a plurality of data flows related to at least one application associated with a user equipment (UE);
    identifying at least one data flow, from the plurality of data flows, that requires QoS management related to the at least one application based on an analysis of at least one of a plurality of attributes related to the at least one application;
    classifying the at least one data flow into a QoS class associated with the at least one application;
    prioritizing the at least one data flow based on the QoS class; and
    validating the QoS class after modifying parameters associated with a transport layer by monitoring the plurality of data flows and re-evaluating the QoS class.

2. The method of claim 1, wherein:
    the plurality of data flows related to the at least one application comprises connections between the UE and a network entity; and
    the plurality of data flows related to the at least one application is received from an application layer in the network entity.

3. The method of claim 1, wherein:
    the plurality of attributes comprises a 5-tuple, a connection duration, a data reception, and a connection frequency, and
    the at least one of the plurality of attributes comprises at least one of a source/destination internet protocol (IP)

address, a source/destination port, a transport protocol, duration details of a transport layer connection, an amount of data downloaded/uploaded per data flow, a pattern of connections establishment and termination, a pattern of application's read and write from buffers, a domain name associated with the data flow, mapping details of dedicated port numbers to specific services, and a unique application identifier (UID) for distinguishing an application.

4. The method of claim 1, wherein the QoS class is one of a constant bit rate, low-latency and high-reliability, or high-data rate.

5. The method of claim 1, wherein prioritizing the at least one data flow comprises dynamically sizing transmission control protocol (TCP) receive and send windows, congestion and flow control parameters, and utilizing type of service (ToS) bits of an IP header for improving the QoS.

6. The method of claim 1, further comprising evaluating network capabilities based on real-time signal and transmissions parameters, and allocating resources for fulfilling QoS conditions.

7. The method of claim 1, further comprising:
evaluating a network condition upon classifying the at least one data flow into the QoS class;
configuring the parameters associated with the transport layer in a network entity for the at least one data flow based on the QoS class and the network condition; and
operating the transport layer for the at least one application based on the configured parameters,
wherein the evaluation of the network condition comprises assessing a current network condition using one or more parameters comprising type of radio access technology (RAT), received signal strength indicator (RSSI) for received Wi-Fi signal power measurement, a measurement of a received power level in a long term evolution (LTE) cell network, channel quality indicator (CQI) details, service set identifier (SSID) details, a bandwidth available to the UE, a round-trip time (RTT) of the network, and a packet loss ratio.

8. The method of claim 7, wherein configuring parameters of the transport layer comprises modifying at least one of a transmission control protocol (TCP) receive buffer, a TCP congestion window, an initial receive window, an initial congestion window, a slow-start threshold, congestion control parameters as per a classified QoS class based on a network capability, and setting differentiated service code point (DSCP) bits in an internet protocol (IP) layer to correspond to the QoS class and signaling the DSCP bits to a corresponding peer entity,
wherein the DSCP bits comprise a bit indicating high data rate (HDR), a bit indicating a low latency, and a bit indicating a high reliability.

9. The method of claim 1, wherein a context oriented transport (COT) layer is configured in a network entity between an application layer and the transport layer in the network entity,
wherein the COT layer is configured as part of existing communication layers between the UE and the network entity, and
wherein the COT layer is configured as a separate layer in addition to existing communication layers in the network entity.

10. A method of managing quality of service (QOS) for a user equipment (UE) in a communication system, comprising:
determining QoS requirements of each application running in the UE; and
configuring a context oriented transport (COT) layer between the UE and a network entity for varying a data flow for each application with reference to QoS requirements for the respective application.

11. A network entity for managing quality of service (QOS) in a communication network, comprising:
at least one processor; and
memory storing instructions that, when executed by the at least one processor, cause the network entity to:
receive a plurality of data flows related to at least one application associated with a user equipment (UE);
identify at least one data flow, from the plurality of data flows, that requires QoS management related to the at least one application based on an analysis of at least one of a plurality of attributes related to the at least one application;
classify the at least one data flow into a QoS class associated with the at least one application;
prioritize the at least one data flow based on the QoS class; and
validate the QoS class after modifying parameters associated with a transport layer by monitoring the plurality of data flows and re-evaluating the QoS class.

12. The network entity of claim 11, wherein:
the plurality of data flows related to the at least one application comprises connections between the UE and a network entity,
the plurality of data flows related to the at least one application is received from an application layer in the network entity,
the plurality of attributes comprises a 5-tuple, a connection duration, a data reception, and a connection frequency, and
the at least one of the plurality of attributes comprises at least one of a source/destination internet protocol (IP) address, a source/destination port, a transport protocol, duration details of a transport layer connection, an amount of data downloaded/uploaded per data flow, a pattern of connections establishment and termination, a pattern of application's read and write from buffers, a domain name associated with the data flow, mapping details of dedicated port numbers to specific services, and a unique application identifier (UID) for distinguishing an application.

13. The network entity of claim 11, wherein the QoS class is one of a constant bit rate, low-latency and high-reliability, or high-data rate,
wherein prioritizing the at least one data flow comprises dynamically sizing transmission control protocol (TCP) receive and send windows, congestion and flow control parameters, and utilizing type of service (ToS) bits of an IP header for improving the QoS.

14. The network entity of claim 11, wherein the instructions, when executed by the at least one processor, cause the network entity to:
evaluate network capabilities based on real-time signal and transmissions parameters; and
allocate resources for fulfilling QoS conditions.

15. The network entity of claim 11, the instructions, when executed by the at least one processor, cause the network entity to:
evaluate a network condition upon classifying the at least one data flow into the QoS class;
configure the parameters associated with the transport layer in a network entity for the at least one data flow based on the QoS class and the network condition; and operate the transport layer for the at least one application based on the configured parameters, wherein the evaluation of the network condition comprises assessing a current network condition using one or more parameters comprising type of radio access technology (RAT), received signal strength indicator (RSSI) for received Wi-Fi signal power measurement, a measurement of a received power level in a long term evolution (LTE) cell network, channel quality indicator (CQI) details, service set identifier (SSID) details, a bandwidth available to the UE, a round-trip time (RTT) of the network, and a packet loss ratio.

16. The network entity of claim 15, the instructions, when executed by the at least one processor, cause the network entity to:

modify at least one of a transmission control protocol (TCP) receive buffer, a TCP congestion window, an initial receive window, an initial congestion window, a slow-start threshold, congestion control parameters as per a classified QoS class based on a network capability, and set differentiated service code point (DSCP) bits in an internet protocol (IP) layer to correspond to the QoS class and signaling the DSCP bits to a corresponding peer entity, wherein the DSCP bits comprise a bit indicating high data rate (HDR), a bit indicating a low latency, and a bit indicating a high reliability.

17. The network entity of claim 11, wherein a context oriented transport (COT) layer is configured in a network entity between an application layer and the transport layer in the network entity, wherein the COT layer is configured as part of existing communication layers between the UE and the network entity, and wherein the COT layer is configured as a separate layer in addition to existing communication layers in the network entity.

18. A multi-layer system for a wireless communication, comprising:

a transport layer;

an application layer; and at least one context oriented transport (COT) layer between the transport layer and the application layer to vary a data flow for a plurality of applications with a reference to predefined quality of service (QOS) requirements for each of the plurality of applications.

19. The multi-layer system of claim 18, wherein the predefined QoS requirements for each of the plurality of applications is based on a context of communication.

* * * * *